US006405824B1

(12) United States Patent
Sørensen et al.

(10) Patent No.: US 6,405,824 B1
(45) Date of Patent: Jun. 18, 2002

(54) HYDRAULIC STEERING ARRANGEMENT

(75) Inventors: Ole Vincentz Sørensen, Nordborg; Lars Mortensen, Augustenborg; Svend Giversen; Johan Van Beek, both of Søonderborg, all of (DK)

(73) Assignee: Sauer-Danfoss Holding A/S, Nordborg (DK)

( * ) Notice: Subject to any disclaimer, the term of this patent is extended or adjusted under 35 U.S.C. 154(b) by 0 days.

(21) Appl. No.: 09/593,407

(22) Filed: Jun. 14, 2000

(30) Foreign Application Priority Data

Jul. 6, 1999 (DE) .......................... 199 31 143

(51) Int. Cl.⁷ ............................................ B62D 5/065
(52) U.S. Cl. ........................ 180/442; 180/441; 180/434; 60/468
(58) Field of Search ................................. 180/441, 442, 180/417, 433, 434, 439; 60/468, 494; 91/447, 434, 439

(56) References Cited

U.S. PATENT DOCUMENTS

| 4,332,303 A | * | 6/1982 | De Maight ................ 180/132 |
| 4,723,475 A | * | 2/1988 | Burk ........................... 91/434 |
| 4,955,445 A | * | 9/1990 | Kauss ......................... 180/133 |
| 5,234,070 A | * | 8/1993 | Noah et al. ................. 180/169 |
| 5,553,683 A | * | 9/1996 | Wenzel et al. ............. 180/417 |
| 6,035,958 A | * | 3/2000 | Saita et al. ................. 180/441 |
| 6,193,009 B1 | * | 2/2001 | Chino et al. ............... 180/441 |

* cited by examiner

Primary Examiner—Avraham Lerner
(74) Attorney, Agent, or Firm—Lee, Mann, Smith, McWilliams, Sweeney & Ohlson

(57) ABSTRACT

A hydraulic steering arrangement with a steering handwheel, which is connected with a hydraulic steering unit, and a steering motor, which is connected with a pump via a steering valve. In a steering arrangement of this kind an improvement of the steering comfort is desired. For this purpose, a supply line is located between the steering unit and the pump, and a pressure reduction valve is located in the supply line.

8 Claims, 2 Drawing Sheets

HYDRAULIC STEERING ARRANGEMENT

Figure 1:
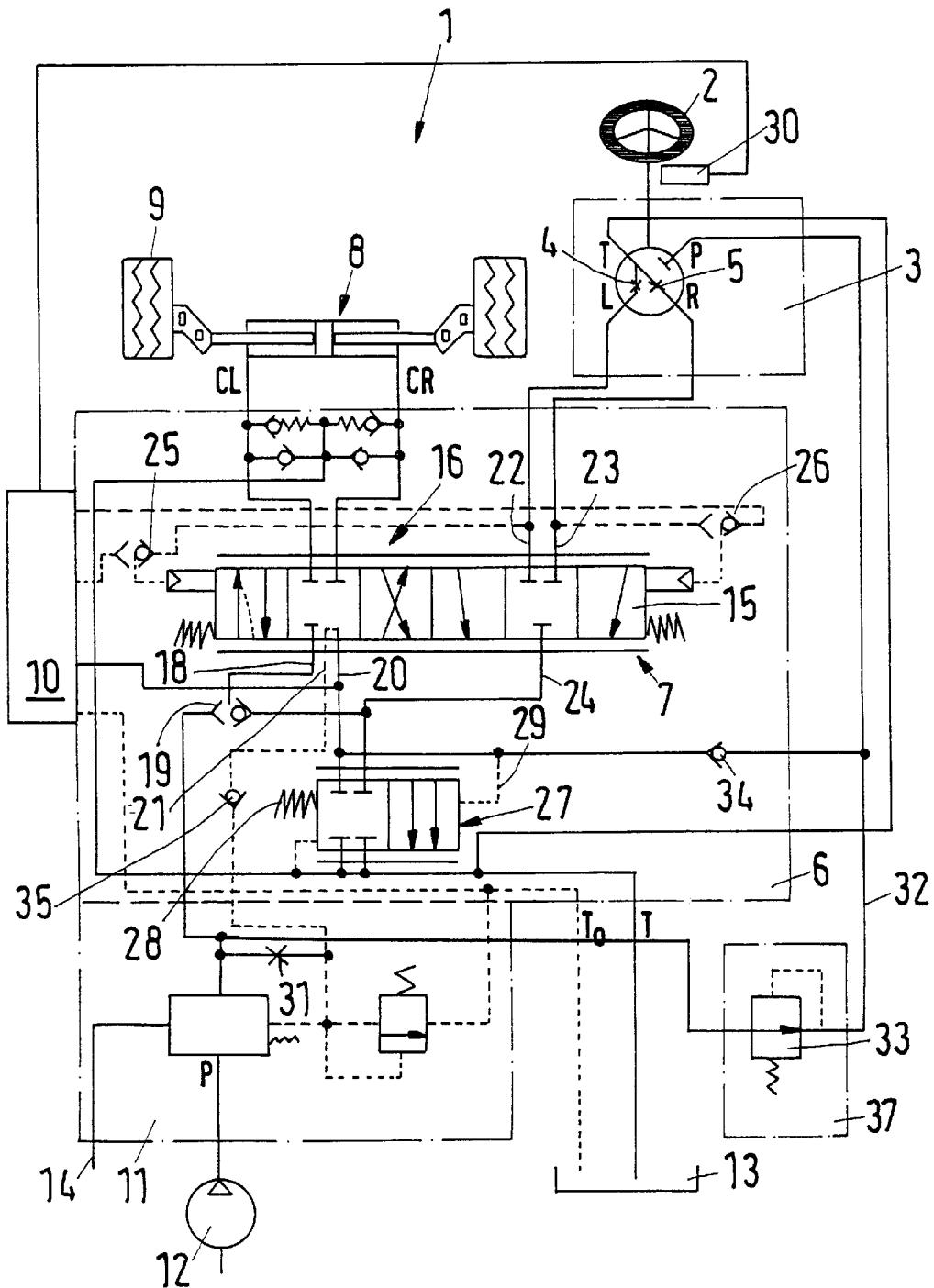

The invention concerns a hydraulic steering arrangement with a steering handwheel, which is connected with a hydraulic steering unit, and a steering motor, which is connected with a pump via a steering valve.

A steering arrangement of this kind is, for example, known from U.S. Pat. No. 5,234,070. In this connection, the steering valve, in dependence of the direction predetermined by the steering handwheel, releases a connection between the pump and the steering motor, which eventually causes the angle movement of the steered wheels of a vehicle. For this purpose, the connection is made or broken through a slide of a steering valve, which slide can be displaced by means of electromagnetic drives. For an emergency operation during failure of the electromagnetic control, the slide can also be displaced by hydraulic pressures, which are produced by the steering handwheel itself.

From the late published German patent application 198 25 579 is known an additional hydraulic steering arrangement, in which the slide of the steering valve can be displaced either by pressures, which are produced by the steering handwheel or by pressures, which are produced by a control pressure generator. In this connection, the steering hand-wheel, or rather, a steering arrangement connected with the steering handwheel, becomes a steering pressure, which corresponds to the LS pressure of the system. When the wheels are not making a steering movement, the slide of the steering valve is in its neutral position, and the corresponding pressure is relatively low. Further, the LS-line mainly permits the propagation of a pressure. This line is less suited for transporting hydraulic fluids. The supply of the steering unit by means of this "dynamic flow" can therefore cause that a so-called "hard point" occurs in connection with the steering. This "hard point" occurs when in relation to the load to be moved, that is the wheels, the pressure available is not sufficient. This is particularly the case at the beginning of a steering process, and the driver or the operator of a vehicle equipped with such a steering arrangement finds this uncomfortable. Further, this effect may also lead to dangerous situations, as particularly quick emergency movements are made difficult.

The invention is based on the task of improving the steering comfort.

With a hydraulic steering arrangement as mentioned in the introduction, this task is solved in that between the steering unit and the pump a supply line is arranged, in which a pressure reduction valve is arranged.

With this embodiment, hydraulic fluid in the required quantity and with the required pressure is available to the steering unit. As soon as the steering unit is activated, this pressure can reach the steering valve through the corresponding lines leaving the steering unit, to control or move said valve with the corresponding direction order.

When, however, the steering unit, which is substantially only provided for the activation of the steering valve, is supplied with the relatively high pump pressure, this pressure acts upon the inlet of the steering unit. It can easily be in range of, for example, 200 bars. In a normal steering system this is usually not a problem, as here the total flow from the pump connection of the steering unit goes to the load to be steered, that is, the wheels. In the system concerned, however, which works by means of a steering valve, this high pressure is not required, or is even disturbing. For the movement of the slide (or another steering element), the steering valve will do with a pressure of, for example, 5 bars. Accordingly, the corresponding pressure drop would have to be effected in the steering certain heat. Additionally, there is a risk that further to the noise and heat problems, also stability problems could occur, as for the disintegration of this high pressure difference only a very small activation of the steering unit can be permitted. Additionally, there is a risk that, in spite of all precautions, a too high pressure will reach the steering valve and activate it mechanically. For this reason, a pressure reduction valve is arranged in the supply line. This pressure reduction valve reduces the pump pressure to such a level that it no longer means any risk to the steering unit. Accordingly, the steering unit can still be working together with a steering valve. However, the noises and the heat development in the steering valve will be drastically reduced or even completely eliminated. In this connection, the supply line can be provided next to the available steering pressure line or supplement it. As now hydraulic fluid in sufficient quantity and with sufficient pressure is always available to the steering unit, problems with a "subsequent supply" will not occur, so that the steering process can take place with the desired hydraulic support already from the beginning.

Preferably, the pressure reduction valve is made as a pressure limitation valve. This is particularly favourable in connection with varying pump pressures, as here the pressure is in fact limited to a maximum value. Here it should be mentioned that the term "pump pressure" does not only mean the pressure, which is available on the physical outlet of a pump. It can also be the pressure of a series-connected unit, for example the outlet of a priority valve, which again may comprise a pressure control valve.

Preferably, the steering valve is optionally operable by means of a steering handwheel or a hydraulic pressure produced by a control pressure generator. Here appears the particular advantage of the embodiment according to the invention. A steering valve, which is operable by means of a hydraulic pressure produced by a control pressure generator, is usually dimensioned for relatively small pressures. Higher pressures would make the electrical steering difficult and uneconomical. When now on the one hand it is provided that the steering unit receives a sufficient amount of hydraulic fluid with the corresponding pressure, on the other hand, however, this pressure is limited, it is still possible to combine the hydraulic steering via the steering handwheel and an electrohydraulic steering via the control pressure generator, without causing a risk of damaging or other negative influences.

Preferably, the pressure reduction valve is arranged in a position, in which it is acoustically and/or thermally decoupled from a place, in which the steering unit is arranged. Usually, the steering unit is arranged in the proximity of the steering handwheel. Having to be operated by the driver or the operating person, the steering handwheel must be arranged at the "working place", that is near the driver's seat in a vehicle, which is equipped with the steering arrangement. In many modern machines, for example, agricultural working machines, this working place is surrounded by a cabin. This cabin also provides a certain noise insulation. When the pressure reduction was made in the cabin, for example, immediately next to the steering arrangement, the problem would occur that the noise, from which the cabin was supposed to protect, would be produced inside same cabin. With the embodiment shown, it can be ensured that the pressure reduction valve is arranged in a different place, for example, outside the driver's cabin. This causes a substantial reduction of noises and heat in the cabin, also when the steering unit is placed here. Similar considerations also apply when no driver's cabin is available. In this case, the pressure reduction valve can be placed at a distance from the driver's seat, to keep the driver away from noises, which may be produced by the pressure reduction valve. Preferably, the supply line is connected with a return flow connection of the steering valve via a non-return valve opening in the direction of the supply line, which return flow connection is connected with the steering motor when the steering valve is activated. This connection is used with a so-called emergency steering, when the pump fails. In case of an emergency steering, it namely permits steering with the oil that returns from the steering motor, the steering unit acting as pump. This gives an emergency steering, which is faster than usual steerings, in which oil first had to be sucked in from the tank.

In the following the invention is described on the basis of a preferred embodiment in connection with the drawings, showing:

FIG. 1 a schematic view of a hydraulic steering arrangement

Figure 2:
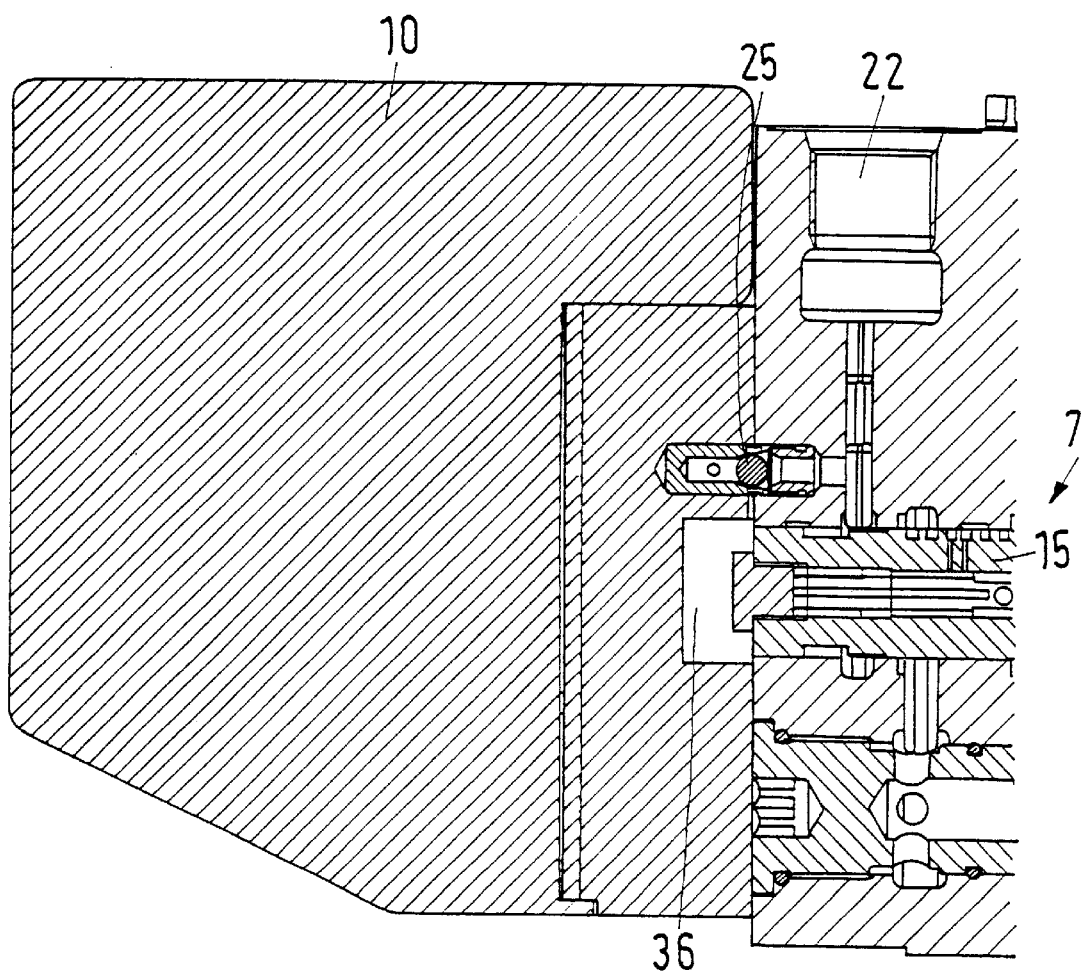

FIG. 2 a schematic view of an end of the steering valve

A hydraulic steering unit 1 has a steering handwheel 2, which is connected with a steering unit 3. The steering unit 3 is an ordinary steering unit with two mutually rotatable slides. In this connection, the steering handwheel turns one of the two slides, thus releasing a path from one pump connection P to one of the direction connections L, R, whereas the other direction connection R, L is connected with a tank connection T. On passing of the hydraulic fluid, a measuring motor is activated, which accordingly brings the second slide back to overlapping the first slide, in order to stop the flow of hydraulic fluid again in dependence of the movement of the steering handwheel 2. The measuring motor can also be used as auxiliary pump, so that an operation of the steering handwheel will produce a hydraulic pressure at one of the two direction connections L, R. As indicated, each direction connection L, R, is mounted in series with a throttle 4, 5.

Further, the steering unit 1 has a valve block 6, comprising a steering valve 7. On the outlet, the valve block is connected with a steering motor 8, steering the steered wheels 9 of a vehicle (not shown in detail). For this purpose, the valve block has two direction connections CL, CR, which are connected with corresponding working chambers of the steering motor.

Flanged onto the valve block 6 is a control pressure generator 10, which, as will be explained later, produces hydraulic pressures, which can be used for the operation of the steering valve 7.

The valve block 6 is connected with a pump 12 via a priority valve 11. An additional connection exists between the valve block 6 and a tank 13. Instead of the pump 12 shown, another pressure source and instead of the tank 13 shown, another pressure sink can be used.

The priority valve 11 is known per se. It ensures that the steering arrangement 1 is preferably supplied with pump pressure, also when other consumers are connected on a connection 14.

The steering valve 7 has a slide 15, which is shown in the neutral position.

The slide 15 has a first section 16, which is responsible for a connection between the steering motor 8 and the pump 12. For this purpose, a first connection 18 is provided, which is connected with the outlet of a supply change-over valve 19. An inlet of the supply change-over valve 19 is connected with the pump 12 via the priority valve 11. When the slide 15 is moved to the right, the connection 18 is connected with the direction connection CL. The direction connection CR is connected with a connection 20, through which returning hydraulic fluid can reach the tank 13, as explained in detail below. At the same time, an LS-connection 21 is supplied with the load pressure of the steering motor 8. The LS-connection 21 therefore always carries the highest pressure existing in the system. In the neutral position of the slide 15, the LS-connection 21 is connected with the outlet of the priority valve 11 via a throttle. The throttle 31 prevents a large volume flow through the LS-line.

When the slide 15 is displaced to the left, accordingly the other direction connection CR is supplied with pressure, and the wheels 9 are steered in the other direction.

Further, the steering valve has two connections 22, 23, which are connected with the corresponding direction connections L, R of the steering unit 3. When the slide 15 is displaced to the right, the connection 22 is connected with the second inlet of the supply change-over valve 19. When the slide 15 is displaced in the other direction, the connection 23 is connected with the supply change-over valve 19 via the connection 24 of the steering valve 7.

The displacement of the slide 15 occurs under the influence of hydraulic pressures. The springs, which have no detailed reference, only serve the purpose of keeping the slide 15 in its neutral position.

The hydraulic pressures, which are used for the operation of the steering valve 7, can be produced in two different ways. Firstly, the hydraulic pressures are produced by the control pressure generator 10 and led to the frontsides of the slide 15 via change-over valves 25, 26. However, the hydraulic pressures can also be produced through an operation of the steering unit 3. The other inlets of the change-over valves 25, 26 are namely connected with the connections 22, 23. The change-over valves 25, 26 lead the higher of the two pressures from the control pressure generator 10 or the steering unit 3, respectively, to the front side of the slide 15 of the steering valve 7. As it is guaranteed that the pressures producable by the control pressure generator are always smaller than the pressures producable by the steering unit 3, it is ensured that the steering handwheel 2 can always interfere in the steering behaviour of the vehicle, independently of the steering pressures produced by the control pressure generator 10. The control pressure generator 10, the change-over valves 25, 26 and the steering surface of the slide 15 only have a limited pressure stability.

Also when the control pressure generator 10 fails, the slide 15 of the steering valve 7 can be displaced. In this case, the steering pressure of the control pressure generator is zero, so that the change-over valves 25, 26 pass on the inevitably higher pressure of the steering unit 3 to the front side of the slide 15, thus displacing it.

When the slide 15 of the steering valve 7 is displaced to a working position, a connection between one of the two connections 22, 23 and the connection 24 also exists. When the pump 12 fails, the pressure produced in the steering unit 3 acts upon the connection 24, for example by means of the measuring motor then working as a pump. This pressure is then passed on to the steering motor 8 via the supply change-over valve 19, so that also on pump 12 failure a continued steering of the vehicle is possible.

However, as long as the pump produces its pressure, the pressure on the connection 24 is always smaller, as a pressure drop occurs at the throttles 4, 5 in the steering unit 3.

The connection 20 is connected with the tank line T via a pilot pressure valve 27. In the closing the pilot pressure valve is acted upon by a spring 28 and in the opening direction via a steering pressure line 29.

In the shown neutral position of the slide 15, the LS-connection 21 is connected with the connection 20. Accordingly, the steering pressure from the pilot valve 11 is passed on to the line 29. When this steering pressure is higher than the force of the spring 28, the pilot pressure valve 27 opens, and the excess pressure can flow off to the tank 13. Thus, it is possible to keep the steering pressure at a predetermined value, for example 12 bar. In this case, a connection from the connection 24 to the tank 13 is at the same time released, so that the second inlet of the supply change-over valve 19 is released.

If, however, the slide 15 is displaced to one of its working positions, the connection between the LS-connection 21 and the connection 20 is interrupted. In connection 20 then rules the pressure of the fluid flowing back from the steering motor 8. When this pressure exceeds the force of the spring 28, the pilot pressure valve 27 opens, and the fluid can flow off to the tank 13.

At the steering handwheel 2 is arranged a sensor 30, which in a manner not shown in detail is connected with the control pressure generator 10. By means of the sensor 30, for example, the angle position of the steering handwheel 2 can be detected, the control pressure generator 10 producing on the basis of this information according to preset algorithms the corresponding steering pressures according to size and time, to steer the slide 15.

Up to this point, the embodiment and the mode of functioning correspond largely to that described in the German patent application 198 25 579.

Additionally, however, the outlet of the priority valve 11 is connected direct with the pump inlet P of the steering unit 3 via a line 32. In the supply line 32 a pressure reduction valve 33 is arranged, which additionally limits the pressure to a maximum value, and thus can also be regarded as a pressure limitation valve. In the line leading from the supply line 32 to the connection 20, a non-return valve 34 is arranged, which opens in the direction of the supply line 32. An additional non-ret urn valve 35 is arranged in the LS-line to the connection 20. This non-return valve 35 also opens i n the direction of the connection 20.

With this embodiment, the following is obtained: Hydraulic fluid under a predetermined pressure is always ruling at the steering unit 3. Additionally, hydraulic fluid in sufficient quantity is kept ready. As soon as the driver activates the steering handwheel 2, sufficient hydraulic fluid is available to move the slide 15, and no waiting is required for hydraulic fluid to be "resupplied" through the LS-line via the connection 20. Thus, a so-called hard Point at the beginning of the steering is avoided.

On the other hand, the pressure reduction valve 33 protects the steering unit 3 from a too high pressure, which is usually available on the outlet of the pump, for the operation of the steering motor 8. Even though the steering unit 3 might be able to stand this high pressure, the propagation of this pressure to the steering valve 7 may cause certain problems. This is shown in FIG. 2.

FIG. 2 shows the left end of the steering valve 7 with the slide 15 and a pressure chamber 36, in which the pressure required to displace the slide 15 is built up. It can be seen that the pressure over the change-over valve 25 can come from either the control pressure generator 10 or via the connection 22 from the steering unit 3. Thus, the pressure chamber 36 must be dimensioned so that it can stand both pressures. If the pump pressure would immediately be fed into the pressure chamber, this might in some cases cause the control pressure generator 10 to be detached from the steering valve 7. In such cases, however a control pressure generator can be used, which is known from ordinary proportional valves. In such proportional valves, a pressure of about 12 bars is used for the hydraulic activation. The components, which are used for this system, are dimensioned so that they can stand this pressure (and a safety margin), however not a pressure of 250 bar.

FIG. 1 shows schematically that the pressure reduction valve 33 is arranged in a separate housing 37, which can be mounted at a certain distance from the valve block 6 on a vehicle. When it is assumed that the valve block 6 or at least the steering unit 3 is arranged in the driver's cabin, the housing 37 with the pressure reduction valve 33 is arranged outside the cabin, and as far away from it as possible, to keep any noise annoyance, which might occur because of the pressure reduction, away from the driver. Additionally, this embodiment enables an improved heat dissipation. However, the pressure reduction valve 33 can also be integrated in the valve block 6, and then only place the steering unit in the driver's cabin, whereas the rest of the steering unit is arranged elsewhere on the vehicle.

What is claimed is:

1. Hydraulic steering arrangement comprising a steering handwheel which is connected to a hydraulic steering unit and having a steering motor controlled by the steering unit, the steering motor being connected to a pump via a steering valve, and including a supply line located between the steering unit and the pump, the supply line including a pressure reduction valve to limit pressure supplied to the steering unit.

2. Steering arrangement according to claim 1, in which the pressure reduction valve is a pressure limitation valve.

3. Steering arrangement according claim 1, in which the steering valve is operable by means of the steering handwheel.

4. Steering arrangement according to claim 1, in which the steering valve is operable by means of a hydraulic pressure produced by a control pressure generator.

5. Steering arrangement according to claim 1, in which the pressure reduction valve is located in a position, in which it is acoustically decoupled from a place in which the steering unit is located.

6. Steering arrangement according to claim 1, in which the pressure reduction valve is located in a position, in which it is thermally decoupled from a place in which the steering unit is located.

7. Steering arrangement according to claim 1, in which the pressure reduction valve is located in a position, in which it is acoustically and thermally decoupled from a place in which the steering unit is located.

8. Steering arrangement according to claim 1, in which the supply line is connected with a return flow connection of the steering valve via a non-return valve opening in the direction of the supply line, which return flow connection is connected with the steering motor when the steering valve is activated.

* * * * *